United States Patent
Vilan

(10) Patent No.: US 10,701,268 B2
(45) Date of Patent: Jun. 30, 2020

(54) WEAVING PLURAL SPARSE SCAN PASSES TO MITIGATE THE EFFECTS OF MOTION

(71) Applicant: Microsoft Technology Licensing, LLC, Redmond, WA (US)

(72) Inventor: Sahar Vilan, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 116 days.

(21) Appl. No.: 15/937,052

(22) Filed: Mar. 27, 2018

(65) Prior Publication Data
US 2019/0306428 A1 Oct. 3, 2019

(51) Int. Cl.
| | |
|---|---|
| *H04N 3/28* | (2006.01) |
| *H04N 5/253* | (2006.01) |
| *H04N 5/232* | (2006.01) |
| *G06T 5/00* | (2006.01) |
| *H04N 3/08* | (2006.01) |
| *G02B 26/10* | (2006.01) |
| *G01S 7/481* | (2006.01) |

(52) U.S. Cl.
CPC ....... *H04N 5/23287* (2013.01); *G01S 7/4817* (2013.01); *G02B 26/101* (2013.01); *G06T 5/003* (2013.01); *H04N 3/08* (2013.01)

(58) Field of Classification Search
CPC ...... H04N 5/23287; H04N 3/08; G06T 5/003; G02B 26/101
USPC ........... 348/203, 195, 201, 135, 169, 208.14
See application file for complete search history.

(56) References Cited

U.S. PATENT DOCUMENTS

| | | | |
|---|---|---|---|
| 6,832,724 B2 * | 12/2004 | Yavid | G06F 16/40 235/454 |
| 9,766,060 B1 | 9/2017 | Honkanen et al. | |
| 9,869,754 B1 | 1/2018 | Campbell et al. | |
| 2016/0245903 A1 | 8/2016 | Kalscheur | |

OTHER PUBLICATIONS

PCT Search and Written Opinion in PCT Application No. PCT/US2019/022166, dated Jun. 5, 2019, 15 pages.
"Microscanner," available at <<https://en.wikipedia.org/wiki/Microscanner>>, Wikipedia article, accessed on Mar. 5, 2018, 5 pages.
"Time-of-flight camera," available at <<https://en.wikipedia.org/wiki/Time-of-flight_camera#Direct_Time-of-Flight_imagers>>, Wikipedia article, accessed on Mar. 5, 2018, 11 pages.

(Continued)

*Primary Examiner* — Jefferey F Harold
*Assistant Examiner* — Jean W Desir

(57) ABSTRACT

A technique is described herein for using an optical scanning system to visit points in a field along a scanning path. The scanning path includes consecutive passes, corresponding to time-shifted instances of a same scan pattern. The plural passes visit different sets of points within the field, to provide different respective sparse traversals of the field. When motion occurs, the passes evenly distribute the deleterious effects of motion over the field. This produces motion artifacts that resemble blur. The human eye and image processing systems can more effectively handle the presence of blur compared to the kind of motion artifacts produced by a traditional single-pass scanning operation.

20 Claims, 8 Drawing Sheets

(56) References Cited

OTHER PUBLICATIONS

"Unsharp masking," available at <<https://en.wikipedia.org/wiki/Unsharp_masking>>, Wikipedia article, accessed on Mar. 5, 2018, 4 pages.
"Virtual retinal display," available at <<https://en.wikipedia.org/wiki/Virtual_retinal_display>>, Wikipedia article, accessed on Mar. 7, 2018, 2 pages.
"Laser video display," available at <<https://en.wikipedia.org/wiki/Laser_video_display>>, Wikipedia article, accessed on Mar. 7, 2018, 4 pages.
Hwang, et al., "Frequency selection rule for high definition and high frame rate Lissajous scanning," available at <<https://www.nature.com/articles/s41598-017-13634-3>>, Scientific Reports, vol. 7, Article No. 14075, Oct. 26, 2017, 8 pages.
Rosenbrock, Adrian, "Blur detection with OpenCV," available at <<https://www.pyimagesearch.com/2015/09/07/blur-detection-with-opencv/>>, PyImageSearch, Sep. 7, 2015, 41 pages.

* cited by examiner

US 10,701,268 B2

WEAVING PLURAL SPARSE SCAN PASSES TO MITIGATE THE EFFECTS OF MOTION

BACKGROUND

Scanning systems operate by directing a beam of light onto a field along a scanning path. In a traditional raster scanning approach, a scanning system visits points of the field in a single pass by sweeping the beam back and forth across the field while moving it from the top of the field to the bottom, or vice versa. While ubiquitous, the traditional approach produces artifacts when the scanning system and/or an object that is being scanned moves during the scanning operation. These artifacts are distracting to viewers. Moreover, an image processing engine may be unable to successfully remove or mitigate these kinds of artifacts.

SUMMARY

A technique is described herein for using an optical scanning system to visit points in a field along a scanning path. In one implementation, the scanning path includes consecutive passes, corresponding to time-shifted instances of a same scan pattern. The plural passes visit different sets of points within the field, to provide different respective sparse traversals of the field. When motion occurs, the passes evenly distribute the deleterious effects of motion over the field. This results in motion artifacts that resemble blur. The human eye and image processing systems can more effectively handle the presence of blur compared to the kind of motion artifacts produced by a traditional single-pass scanning operation (which may appear as dramatic shape-corrupting dislocations of high-resolution edges.)

In one implementation, the optical scanning system projects a beam of electromagnetic radiation onto a display surface to impart images thereon. For example, the display surface may correspond to the surface of a physical display device, or the retina of a human eye. In another implementation, the optical scanning system projects a beam of electromagnetic radiation onto a surface of a physical object being scanned, as governed by the scanning path, and/or the optical scanning system controls the sampling of radiation reflected from the surface of the physical object based on the scanning path.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 8 also depicts the kinds of motion that may affect the mechanism of FIG. 1.

Figure 1:
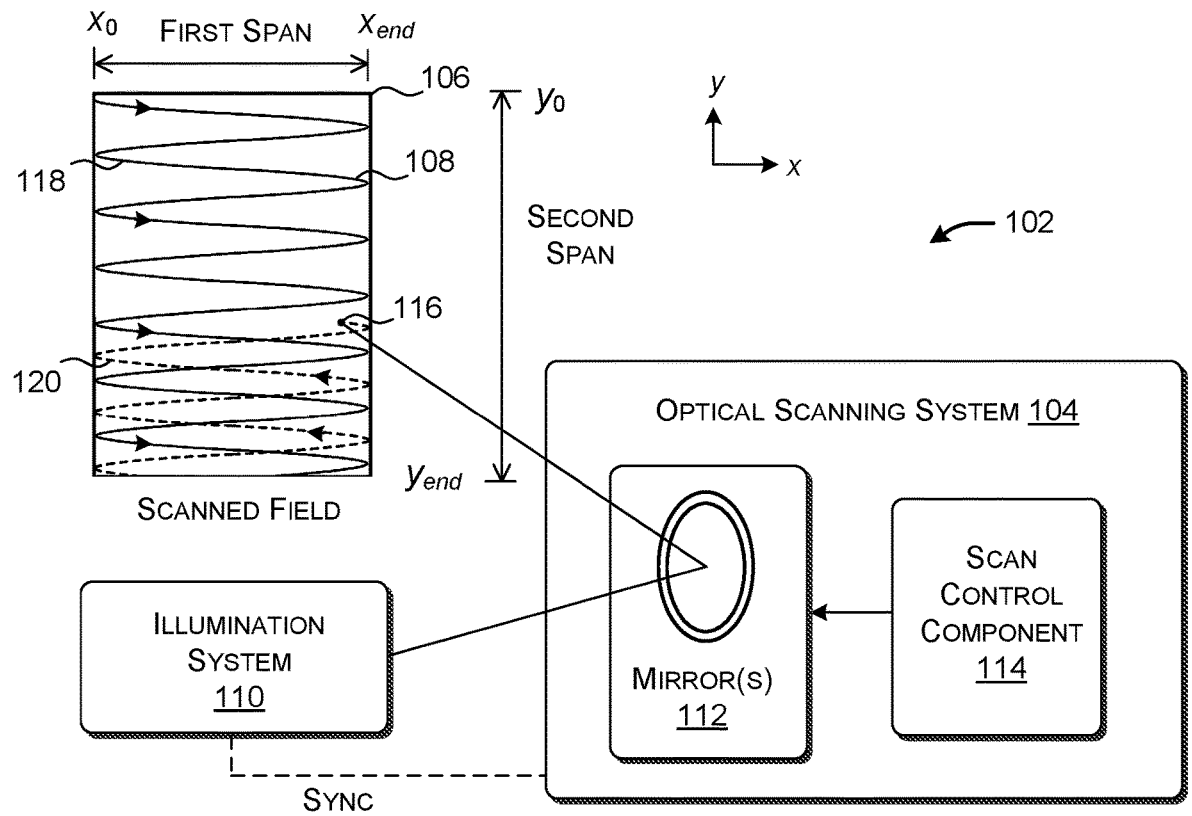
FIG. 1 shows one implementation of a mechanism for scanning a field using a scanning path that is composed of plural passes, each pass providing a sparse traversal of the field.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a motion-resilient mechanism for scanning a field. Section B sets forth illustrative methods which explain the operation of the mechanism of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry.

The terms "component," "unit," "element," etc. refer to a part of the hardware logic circuitry that performs a particular function. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Apparatuses

A.1. Overview

FIG. 1 shows one implementation of a mechanism 102 that uses an optical scanning system 104 (henceforth the "scanning system") to scan a field 106. In one implementation, the scanning system 104 performs this task by directing a beam of electromagnetic radiation, generated by an illumination system 110, onto the field 106 along a prescribed scanning path 108. Alternatively, or in addition, the scanning system 104 samples electromagnetic radiation reflected from the field 106, as governed by the scanning path 108.

As will be described in the next subsection, the field 106 may be associated with different surfaces in different respective implementations. In one implementation, the scanning system 104 projects image information onto a physical display surface that is external to the user. In another implementation, the scanning system 104 directly imparts the image information to the eyes of a user. In another implementation, the scanning system 104 scans the surface of a physical object. In that context, one or more sensors receive electromagnetic radiation reflected from the surface of the object. These examples are mentioned in the spirit of illustration, not limitation; Subsection A.2 describes additional implementations.

More specifically, note that the concept of a field refers to an abstract plane in space over which points are visited by the scanning system 104 in accordance with the scanning path 108. That plane is defined relative to a point of reference, such as the scanning system 104. In some cases, for instance, the plane is normal to a center axis of a scanning frustum defined by the scanning system 104. The physical display surface on which the beam impinges may or may not positionally coincide with the field. For example, the display surface may have an irregular contour, not a plane. Hence, the field is said herein to be associated with the physical display surface on which the beam impinges, rather than positionally identical to the field.

The field 106 generally includes a first span that defines its spatial extent along a first (x) axis, and a second span that defines its spatial extent along a second (y) axis. The y axis is orthogonal to the x axis. The scanning system 104 scans the field 106 back and forth across the x axis at a first rate $r_1$, moving between a position $x_0$ and a position $x_{end}$. The scanning system 104 also scans the field 106 up and down across the y axis at a second rate $r_2$, moving between a position $y_0$ and a position $y_{end}$. Since $r_1 \gg r_2$, the x axis may be regarded as the fast-scanning axis, while the y axis may be regarded as the slow-scanning axis.

The illumination system 110 can produce electromagnetic radiation in any portion(s) of the electromagnetic spectrum. In the case of a display-related context, the illumination system 110 can include three lasers that generate three beam components of light: red, green, and blue. The illumination system 110 combines the three components into a single beam. In a depth-sensing context, the illumination system 110 can use a laser to emit a beam of infrared radiation.

In one implementation, the scanning system 104 includes one or more mirrors 112 which reflect a beam of electromagnetic radiation onto the field 106 along the scanning path 108. In one non-limiting application, the mirror(s) 112 can include a two-axis Micro Electro Mechanical System (MEMS) mirror. That single mirror can direct the beam to any (x, y) position in the field 106. Alternatively, the mirror(s) 112 can include a combination of two or more MEMS mirrors. For instance, the mirror(s) 112 can include a first MEMS mirror that reflects the beam onto a second MEMS mirror, which, in turn, reflects the beam onto the field 106. The first MEMS mirror may move the beam back and forth along the x axis of the field 106, while a second MEMS mirror may move the beam up and down along they axis of the field 106. In another implementation, the mirror(s) 112 can include a single-axis MEMs mirror that moves the beam back and forth along the x axis, together with another micro electro mechanical mechanism that moves the single-axis MEMs mirror in the transverse y direction. Illustrative manufacturers which produce MEMS mirrors include, but are not limited to: Opus Microsystems Corp. of Taipei, Taiwan; Mirrorcle Technologies, Inc. of Richmond, Calif.; Preciseley Microtechnology Corp. of Edmonton, Canada; Fraunhofer IPMS of Dresden, Germany, etc. In other cases, the mirror(s) 112 can include other types of mirrors, such galvanometer-driven rotating mirrors, etc.

In another implementation, the scanning system 104 scans a field-of-view by which it receives electromagnetic radiation reflected from the surface of a physical object. In another implementation, the scanning system 104 scans both the beam which illuminates the field 106 and the field-of-view. FIGS. 5-8 provide additional details regarding various ways that the scanning system 104 may perform its scanning. However, to facilitate explanation, this subsection will assume that the scanning system 104 performs scanning by moving the beam across the field 106.

Further note that the scanning system 104 can perform scanning using other mechanisms besides, or in addition to, the scanning mirror(s) 112. For example, in another implementation, the scanning system 104 can move the illumination system 110 (e.g., by directly moving its laser(s)). Alternatively, or in addition, the scanning system 104 can move the object being scanned. For example, with respect to a microscope, the scanning system 104 can move a platform on which an object is placed, in a manner specified by the scanning path 108. More generally stated, the scan control component 104 is said to move one or more scanning elements in a manner specified by the scanning path 108, where those scanning elements can include one or more mirrors, one or more lasers, a specimen platform, etc., or any combination therefore. To nevertheless facilitate explanation, this disclosure will emphasizes the case in which the scanning system 104 performs scanning by moving one or more mirrors 112.

A scan control component 114 controls the movement of the mirror(s) 112 (and/or other scanning element(s)) such that the mirror(s) 112 produce the desired scanning path. The scan control component 114 generally corresponds to hardware logic circuitry. As set forth in Section C (below), the hardware circuitry may correspond to one or more hardware processors which execute machine-readable instructions stored in memory. Alternatively, or in addition, the hardware logic circuitry may correspond to one or more other hardware logic components that perform operations using a task-specific collection of logic gates.

Although not shown, the illumination system 110 and the scanning system 104 can also include any environment-specific optical components, such as lenses, beam splitters, optical gratings, drivers, modulators, etc.

FIG. 1 shows the scanning path 108 in the course of it being drawn by the scanning system 104. Generally, instead of a single pass that visits every point in the field 106, the scanning path 108 includes plural scanning passes. Each scanning pass visits a subset of the collection of points in the field 106 (not all of the points). For this reason, each scanning path can be said to represent a sparse traversal of the field 106. Further, different scanning passes visit different respective subset of points relative to other scanning passes. In other words, the different scanning passes capture different parts of the field 106 at different respective times. Taken together, the different passes explore the points in the field 106 with respect to a desired resolution.

At the current time depicted in FIG. 1, the scanning system 104 is directing its beam of radiation at a point 116 in the field 106. At this juncture, the scanning system 104 has completed a first pass 118, and is in the process of traversing a second pass 120. The scanning path 108 can include any number n of the passes, such as four, six, eight, etc. Increasing the number of scan paths may increase the resolution of the scanning operation. One particular scanning path will be described in greater detail in the context of FIG. 4 (below).

Figure 2:
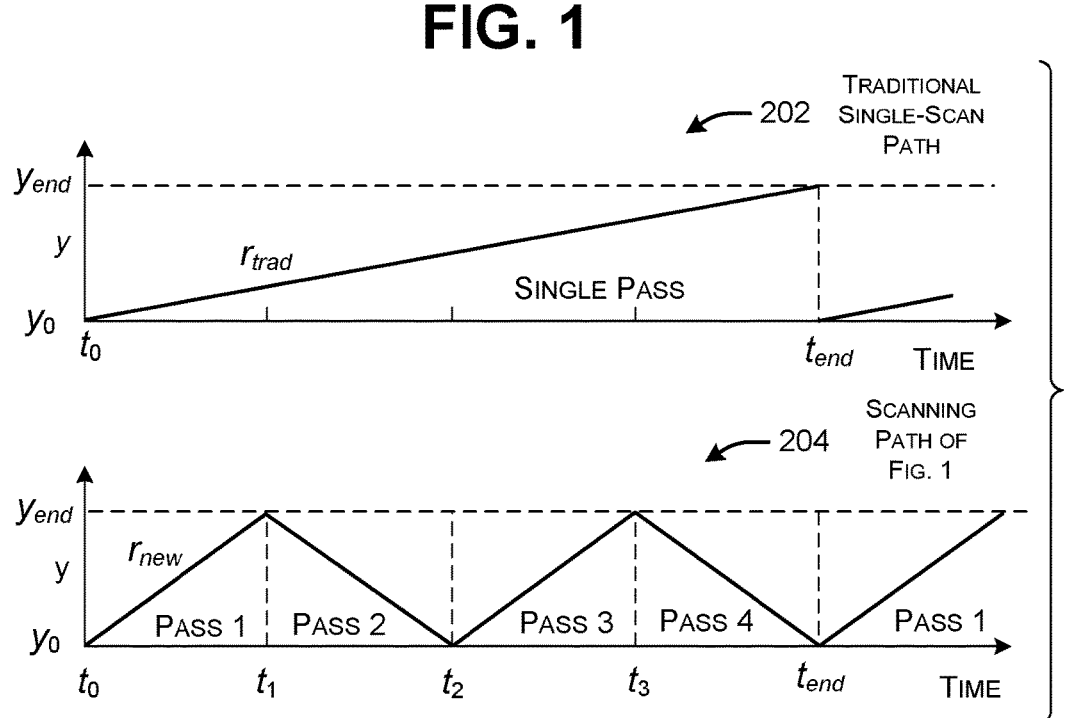
FIG. 2 shows graphs that compare the temporal behavior of the mechanism of FIG. 1 with respect to a traditional scanning system.

FIG. 2 shows a first graph 202 that represents the manner in which a traditional scanning system scans a field. The vertical axis represents movement along the y axis from $y_0$ to $y_{end}$, while the horizontal axis represents the progress of time t. The traditional scanning system performs a single pass that begins at time $t_0$ and ends at time $t_{end}$. Between these two times, the traditional scanning system advances the beam along the y axis (the slow axis) at a rate $r_{trad}$ until it reaches $y_{end}$.

FIG. 2 includes a second graph 204 which shows the manner in which the scanning system 104 of FIG. 2 advances along the y axis as a function of time for the non-limiting case in which the scanning path 108 includes four passes. Between time $t_0$ and time $t_1$, the scanning system 104 performs a first sparse traversal of the entire span of the field 106 along the y axis at a rate $r_{new}$. The rate $r_{new}$ is appreciably faster than the traditional rate $r_{trad}$. Between time $t_1$ and time $t_2$, the scanning system 104 performs a second sparse traversal of the entire span along the y axis at the same rate $r_{new}$, and so on. The fourth pass ends at time $t_{end}$. As shown in the example of FIG. 2, in one implementation, the scanning system 104 of FIG. 1 completes its scan of the entire field 106 in the same amount of time ($t_{end}$) as the traditional scanning system, to produce a representation of the field 106 having the same resolution as the traditional case. But note that the scanning system 104 of FIG. 1 performs its sampling of the field 106 in a fragmented piecemeal manner. (More generally, note that there is no necessity that the scanning system 104 scan the field 106 in the same amount of time as a traditional single-pass scanning system.) Note that the slope that describes each pass is depicted in FIG. 2 as linear. But it need not be linear; for instance, it can correspond to a staircase function, a harmonic (sinus) function, etc.

Figure 3:
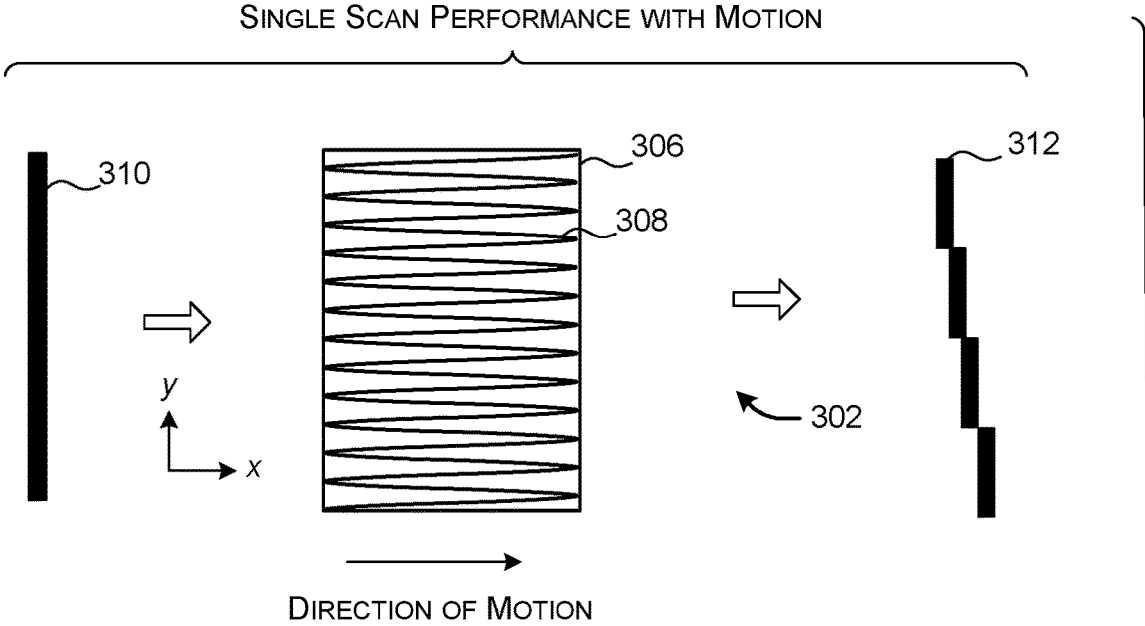
FIG. 3 shows examples that demonstrate the ability of the mechanism of FIG. 1 to mitigate the effects of motion during the scan.
Figure 3:
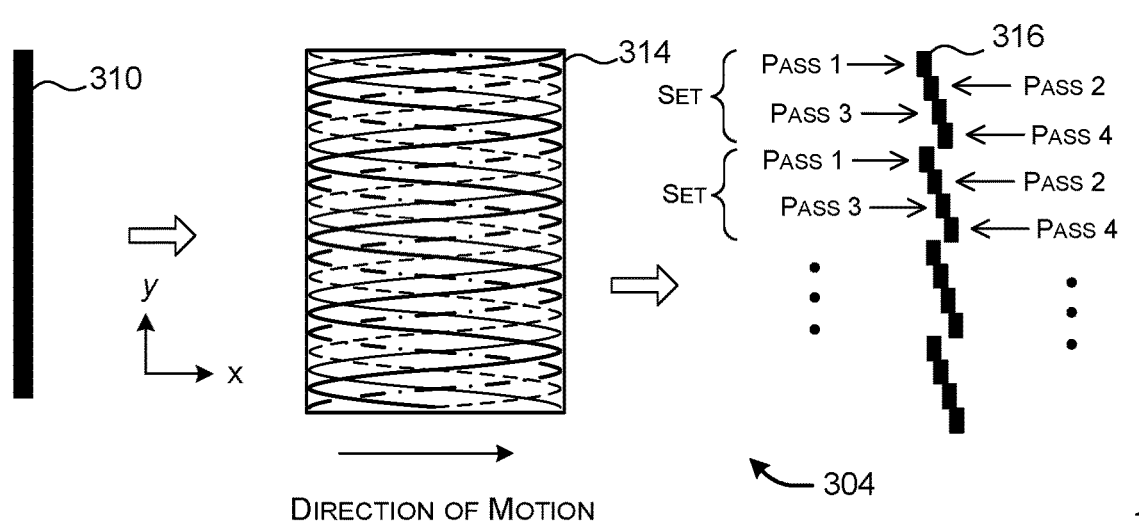

FIG. 3 shows a first example 302 that demonstrates the performance of a traditional scanning system. It also shows a second example 304 that shows the performance of the improved scanning system 104 of FIG. 1 that uses plural scanning passes. Assume that both examples (302, 304) reflect performance in the presence of motion that advances in the x direction from left to right. This motion may occur in a scanning system itself and/or in the environment in which the scanning system operates.

More specifically, in the example 302, a traditional scanning system scans a field 306 using a single scanning path 308. Assume that the goal of the scanning is to reproduce an original image 310 on a display surface, or on the retinas of the user's eyes. Further assume that the original image has one or more edges that extend some length in the y direction.

The traditional scanning system takes a prescribed amount of time $t_{end}$ to traverse the entire field 306 using the single scanning path 308. Assume that, in this span of time, the traditional scanning system is subject to the kind of left-to-right motion described above. Due to this motion, the traditional scanning system produces a distorted representation 312 of the original image 310 on the display surface. More specifically, the distortion corrupts the edges associated with the original image 310, e.g., by progressively rightward-skewing the edges with advancing time.

Further note that the representation 312, while corrupted, is otherwise sharp. This is because, the traditional scanning system produces a high-quality and high-resolution representation of each portion of the field 306 that it visits in sequence as it advances from $y_0$ to $y_{end}$. For instance, in one merely illustrative scenario, if $y_{end}$=1000, the traditional scanning system may produce a high-fidelity representation for $y_0$ to $y_{250}$, a high-fidelity representation for $y_{251}$ to $y_{500}$, a high-fidelity representation for $y_{501}$ to $y_{750}$, and so on. But movement causes sometimes-dramatic shape-corrupting dislocation between the high-fidelity parts of the representation 312. This kind of motion artifact is problematic for two reasons. First, this kind of artifact is very distracting to human perception. Second, it is difficult for an image processing component to correct this kind of artifact. This difficulty ensues from the fact that the representation 312 appears clear in and of itself; hence, without some knowledge of the original image 310, an image processing component may have no basis for discriminating a faithful reproduction of the original image 310 from a distorted reproduction of the original image 310.

Next consider a second example 304 in which the improved scanning system 104 of FIG. 1 projects the same image 310 onto a field 314, such as a display surface associated with a display surface or human retinas. In this case, the scanning system 104 produces a representation 316 of the original image 310 that is also corrupted with motion artifacts, but in a different way compared to representation 312 produced in the first example 302. That is, the improved scanning system 104 of FIG. 1 has the effect of more thoroughly and evenly distributing the deleterious effects of motion across the y axis span of the representation 316. More specifically, the representation 316 includes plural sets of segments associated with a single scanning path. The segments in each set correspond to points visited in respective passes. For example, the first segment in each set corresponds to points visited in the first pass. The second segment in each set corresponds to points visited in the second pass, and so on. In effect, the scanning system 104 converts the low frequency artifact associated with the representation 312 to a high frequency artifact associated with the representation 316.

Human perception is more likely to interpret this kind of corruption shown in the represent 316 as a blurry or fuzzy edge, rather than a dislocated and broken edge (as in the first example 302). Indeed, with a sufficient number of passes, the improved scanning system 104 of FIG. 1 can produce artifacts resembling the same kind of image blur that a non-scanning image-reproduction system produces in the presence of motion.

There are two advantages to the type of distortion shown in the representation 316 compared to the representation 312. First, the distortion in the second example 304 is less distracting to human perception compared to the distortion produced by the first example 302. Second, as will be described in greater detail below, an apparatus can efficiently apply image enhancement algorithms to reduce the kind of distortion shown in the second example 304. The apparatus performs this task by treating the motion artifacts of the type shown in the representation 316 as image blur.

Figure 4:
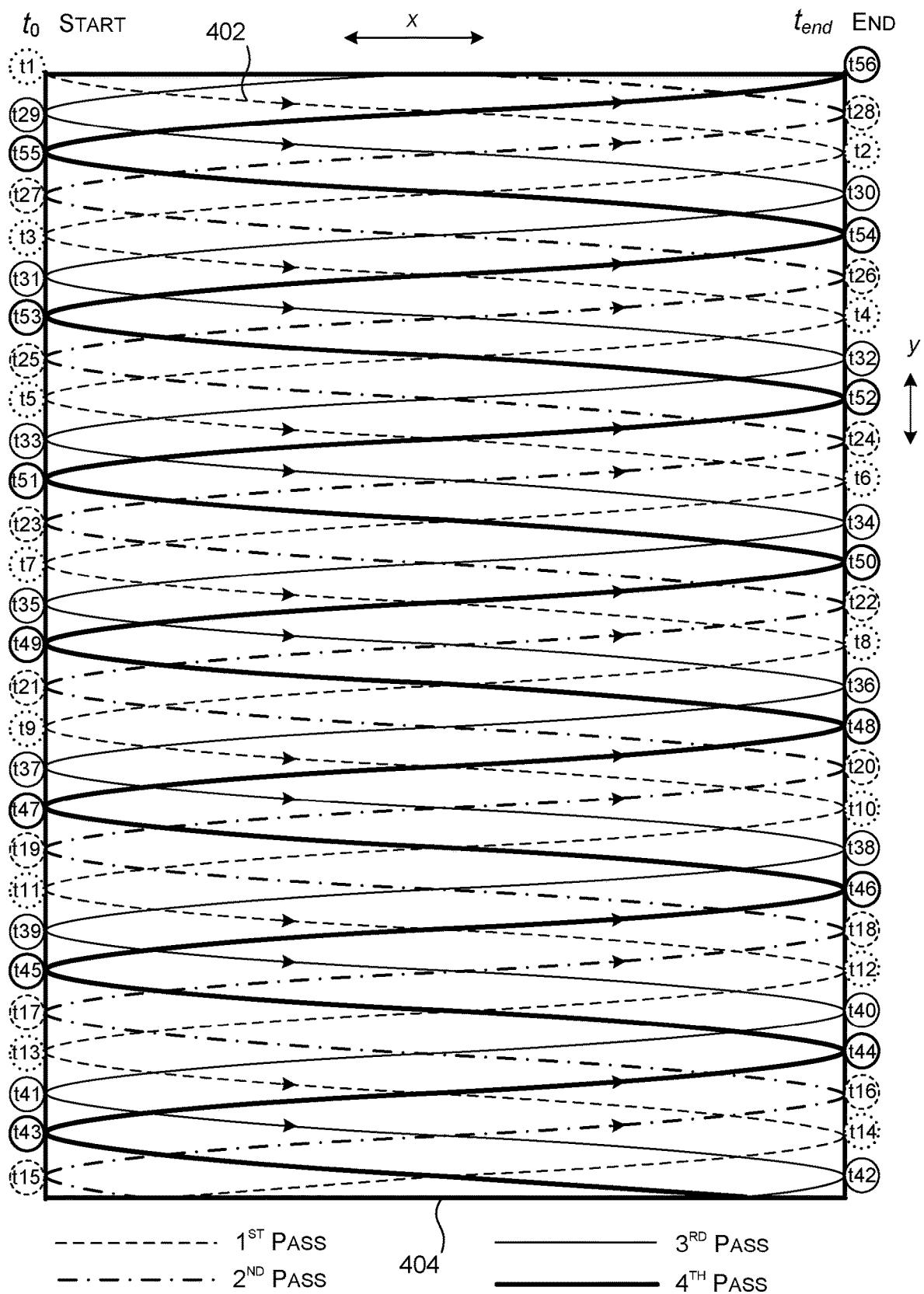
FIG. 4 shows one scanning path that may be used by the mechanism of FIG. 1.

FIG. 4 shows a scanning path 402 that the scanning system 104 of FIG. 1 may apply to a field 404. The scanning path 402 includes four consequently-performed passes, each of which provides a sparse sampling of the field 404. However, as set forth above, the scanning system 104 can include any number n of passes.

In one implementation, the passes correspond to time-shifted instances of a same scan pattern. For instance, in one example, the scan pattern associated with an individual pass includes repeated sweeps back and forth across the first span (along the x axis) at a first rate. The scan pattern also includes movement across the second span (along the y axis) at a second rate. The first rate is greater than the second rate. In one implementation, the scanning system 104 produces a scan pattern using a sinusoidal signal generator, or a linear saw tooth generator, etc. To produce a desired time shift, the scanning system 104 chooses the phase at which each scan pattern commences.

In the example of FIG. 4, the first pass begins at time $t_0$ (at $y_0$) and ends at the bottom of the field 404 (at $y_{end}$) at around time $t_{14}$. The second pass begins around time $t_{15}$ at the bottom of the field 404 and ends around time $t_{28}$ at the top of the field 404. The third pass begins around time $t_{29}$ at the top of the field 404 and ends at the bottom of the field 404 around time $t_{42}$. And finally, the fourth pass begins around time $t_{43}$ at the bottom of the field 404 and ends at the top of the field 404 at time $t_{end}$. These four passes make up a single frame of information that is imparted or received. In another implementation, the scanning system 104 can begin each new pass at the top of the field 404, e.g., by blanking out the light source(s) and rapidly moving from the bottom of the field 404 (at the end of a pass) to the top of the field (to commence a next pass).

In addition to the number of scanning passes, the scanning system 104 can also be configured to choose the rate ($r_{new}$ in FIG. 2) at which it advances along the y axis. A change in this rate also controls the level of sparsity of an individual pass. That is, the scanning system 104 visits fewer points in the field by more quickly advancing to the bottom of the field 404, $y_{end}$.

Note that the four passes shown in FIG. 4 visit different sets of points within the field. This means that the scanning system 104 provides different respective sparse traversals of the field captured at different times. In other words, the scanning system 104 produces the effect of weaving together different parts of the scanning path 402. As explained in connection with FIG. 3, the plural passes, taken together, evenly distribute motion artifacts over the field upon the occurrence of motion, e.g., by scrambling the deleterious effects of motion within the field 404. This produces artifacts that resemble blur (e.g., as perceived by a human observer).

Further note that the scanning system 104 can produce a desired resolution and motion-distribution performance by choosing an appropriate pairing of parameter values (n, $r_{new}$), where n is the number of passes and $r_{new}$ is the rate at which the scanning system 104 traverses the y span of the field 404. The system 104 increases the resolution by increasing n. It increases its ability to distribute the deleterious effects of motion by increasing $r_{new}$. But it also decreases the resolution of each individual pass by increasing $r_{new}$.

Further note that the scanning path 402 provides a uniform sampling of the field 404 with respect to the spatial dimension, e.g., by not over-sampling some parts of the field 404 and/or under-sampling other parts of the field 404. Further, the scanning path 402 evenly distributes its sampling of the field 404 over the dimension of time. These two factors help evenly distribute motion artifacts across the y dimension of image information. This makes the scanning path 402 superior to a Lissajous pattern (for instance), which does not achieve the same kind of distributional effects.

According to another implementation, the scanning system 104 can temporally shift entire scanning paths (e.g., entire frames) relative to each other (in addition to shifting passes associated with each frame). For example, assume that a first frame commences its four passes at phases defined by 0, ¼, ½, and ¾. The scanning system 104 can shift a second frame relative to the first frame by commencing it four passes at phases ⅛, ⅜, ⅝, and ⅞, e.g., by shifting the entire second frame relative to the first frame by ⅛. The scanning system 104 can continue this shifting behavior for any number of subsequent frames. Or the scanning system 104 can continue this shifting behavior only when some environmental condition is detected (to be described below in connection with FIG. 9).

By virtue of the above-described frame-shifting behavior, the scanning system 104 can further distribute artifacts over the field 404. This behavior is particularly useful when the motion that causes artifacts is periodic in nature. In this case, the scanning system 104 can reduce the impact of predictable motion by distributing it over plural frames. Without this provision, there is a risk that the consistency in the motion might cause aberrations to appear in the output results due to a noise-locking phenomenon, despite that the fact that the scanning system 104 applies plural passes for each frame.

A.2. Example Implementations

Figure 5:
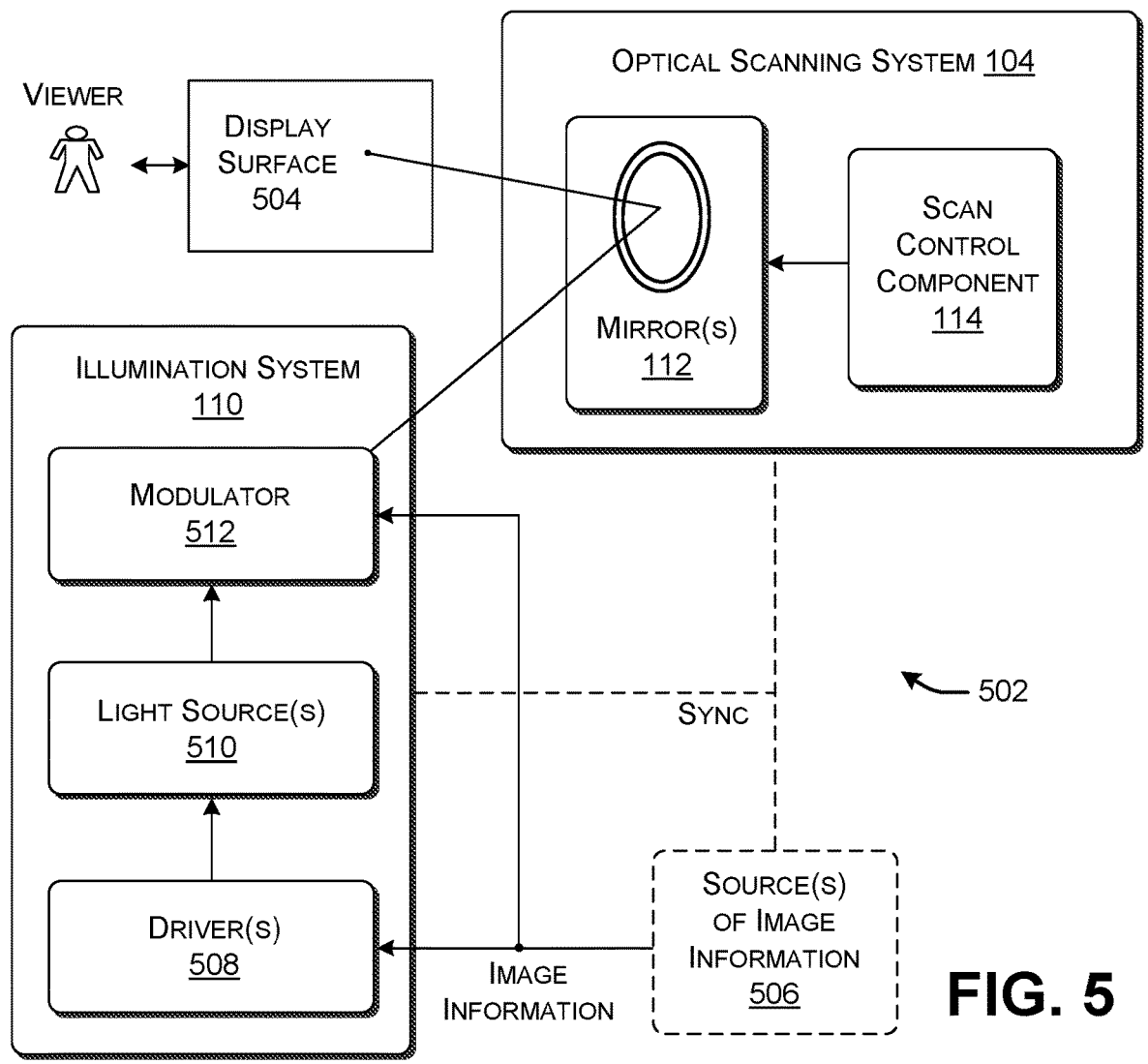
FIG. 5 shows an apparatus that uses the mechanism of FIG. 1 to display image information on a display device.

FIG. 5 shows a display apparatus 502 that uses the mechanism 102 of FIG. 1 to display image information on a display surface 504 that is external with respect to the viewer. The display apparatus 502 displays image information by scanning its beam over the display surface 504. In one example, the display surface 504 corresponds to a wall, a table, a screen of a display device, etc. The display surface 504 can have any size, shape, and contour.

The illumination system receives image information from one or more sources 506. As used herein, the term "image information" corresponds to any information that can be presented in visual form, including, but not limited to, static image information, video information, holographic image information for presentation in a mixed-reality environment, etc. For instance, one source of image information may correspond to a computing device which generates and/or otherwise supplies the image information.

The illumination system 110 can include one or more drivers 508 for driving one or more light sources 510. For instance, the light source(s) 510 can include one or more gas lasers, one or more laser diodes, one or more light emitting diodes (LEDs), etc. In one example, the light source(s) 510 can include red, green, and blue lasers. The illumination system 110 can combine the beams produced by these lasers into a single composite beam.

A modulator 512 modifies the beam produced by the light source(s) 510 to encode the beam with the image information. For instance, the modulator 512 can perform this task in binary fashion by selectively turning on and off the different red, green, and blue components of the beam. Alternatively, or in addition, the modulator 512 can control the intensity of each beam component, with respect to a continuous range of intensity values. Various modulators can be used to perform this task, such as an acousto-optic modulator (AOM).

FIG. 5 also shows that the scanning system 104 operates in synchronization with the illumination system 110. In one implementation, the scan control component 114 informs the modulator 512 about the location of the point in the field 106 that it will project at a next time $t_{current+1}$, with respect to the current point in time $t_{current}$. At the appropriate time, the modulator 512 can then encode the appropriate image information into the beam that is projected to the mirror(s) 112 of the scanning system 104.

Figure 6:
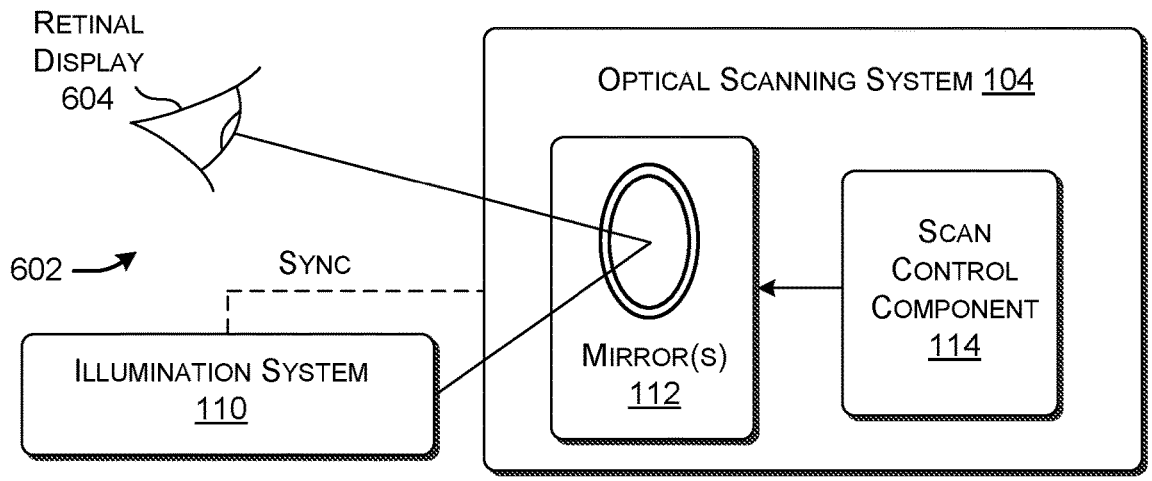
FIG. 6 shows an apparatus that uses the mechanism of FIG. 1 to present image information directly to the eyes of a user.

FIG. 6 shows another display apparatus 602 in which the display surface corresponds to a retinal display 604. That is, in this case, the beam produced by the scanning system 104 directly impinges the retinas of the user's eyes. The display apparatus 602 of FIG. 6 otherwise includes the same principal components as the display apparatus 502 of FIG. 5.

Figure 7:
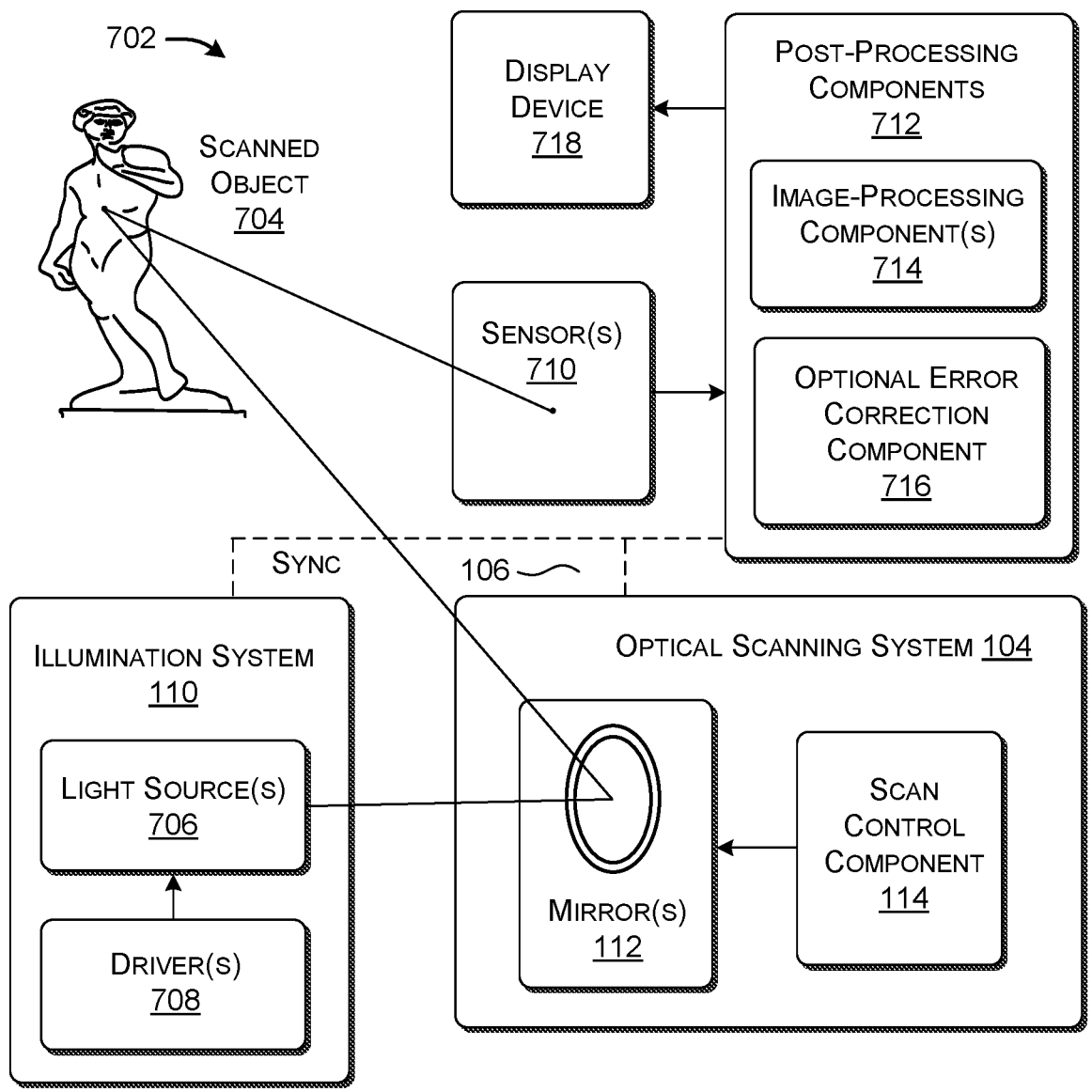
FIG. 7 shows an apparatus that uses the mechanism of FIG. 1 to scan an object.

FIG. 7 shows one kind of object-scanning apparatus 702 that uses the mechanism 102 of FIG. 1 to scan an object 704 of any size, shape, and contour. For instance, the object-scanning apparatus 702 may correspond to a medical scope that projects light onto animal tissue using a prescribed scan pattern. The medical scope then detects and processes light reflected from the tissue. In another use case, the object-scanning apparatus 702 may correspond to a microscope that operates on the same principle as the medical scope. In another use case, the object-scanning apparatus 702 corresponds to a depth camera system that measures the distance between a reference point (e.g., associated with the scanning system 104 itself) and different points associated with the object 704. That is, in an active time-of-flight (ToF) technique, the illumination system 110 emits a pulse of light onto the mirror(s) 112, which then projects the light onto the object 704. The depth camera system detects the light reflected from that point. It then determines the amount of time ($\Delta t$) between the emission of a pulse of light (by the illumination system 110) and the detection of that pulse of light. The depth camera system uses $\Delta t$ to determine the distance between the reference point and the object 704.

The illumination system 110 includes one or more light sources 706 driven by one or more drivers 708. For example, in the case of a depth camera system, the light source(s) 706 may correspond to an infrared-spectrum laser or light emitting diode.

One or more sensors 710 detect light that is reflected from the surface of the object 704, in response to the beam that impinges the surface of the object 704. For example, the sensor(s) 710 can include a semiconductor charge-coupled device (CCD), or a complementary metal-oxide-semiconductor (CMOS) device, etc. In an active ToF context, the sensor(s) 710 provides an output signal which indicates when a pulse of light first impinges the surface of the sensor(s) 710.

Post-processing components 712 process the intensity values provided by the sensor(s) 710 using one or more image-processing components 714. For example, one image-processing component can convert the output signals produced by the sensor(s) 710 to raw depth image information. The depth image information describes the distances between the reference point and different points associated with the object 704. Another image-processing component can use known techniques to reconstruct the surface of the object 704 based on the depth image information. For example, that image-processing component can use the well-known marching cubes algorithm to define a mesh of triangles which describes the surface of the object 704 being scanned.

An optional error correction component 716 can enhance image information provided by the image-processing components 714. For example, the error correction component 716 can remove image frames that exhibit a prescribed amount of blur due to motion and/or any other factor(s), e.g., which can be assessed based on the level of sharpness of edges exhibited by those image frames (e.g., using a gradient-based operator, a Laplacian-based operator, etc.). For example, the error correction component 726 can convolve image information with a Laplacian operator, determine the variance, and compare that result with a threshold value. Alternatively, the error correction component 716 can modify the image information to reduce the amount of blur it exhibits. For example, using the digital unsharp masking technique, the error correction component 716 can apply Gaussian blur to an original version of the image information that is provided by an image-processing component. This yields an artificially-blurred version of the image information. The error correction component 716 can then subtract the artificially-blurred version of the image information from the original version of the image information. This difference yields image information including sharpened details, relative to the original version of the image information.

The object-scanning apparatus 702 can present the processed image information provided by the post-processing components 712 on a display device 718 of any type. Or the object-scanning apparatus 702 can present the processed image information directly to the user via the type of retinal display apparatus 602 shown in FIG. 6.

In another implementation of the object-scanning apparatus 702, the scanning system 104 can perform scanning by moving a narrow field-of-view (FOV) across the object 704 in a manner specified by the scanning path. The scanning system 104 can perform this task by moving the mirror(s) (112) to receive electromagnetic radiation emitted from different points on the object 704. In this case, the light source 706 may continue to produce a beam of electromagnetic radiation, but it need not; for instance, the light source 706 can instead illuminate the entire scanning field, e.g., using pulses of infrared radiation.

In another implementation of the object-scanning apparatus 702, the scanning system 104 can simultaneously move the beam that is used to illuminate the object 704 and the field-of-view that is used to receive electromagnetic radiation reflected from the object 704. For instance, the object-scanning apparatus 702 can project and receive light along a single axis; it can then rely on a beam splitter to direct the received light to the sensor(s) 710. Still other implementations of the object-scanning apparatus 702 are possible; the above implementations are described in the spirit of illustration, not limitation.

Further note that FIGS. 5-8 do not exhaust the possible applications of the scanning system 104 of FIG. 1. In another case, the scanning system 104 can be applied in a printing apparatus, e.g., to apply ink to a substrate. In another case, the scanning system 104 can be applied in a model-generating apparatus (such as a 3D printer), e.g., to build a three-dimensional model. In another case, the scanning system 104 can project electromagnetic radiation (e.g., x-rays) through an object being scanned. The sensor(s) in this case detect the radiation that passes through the object.

Figure 8:
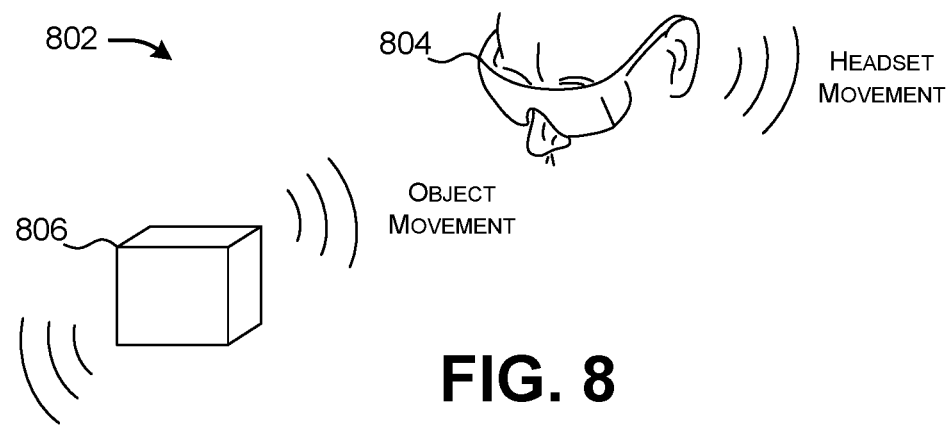
FIG. 8 shows an example of a head-mounted display that may incorporate the apparatus of FIG. 1.

FIG. 8 shows an environment 802 that uses the mechanism 102 described in FIG. 1. The environment 802 includes a head-mounted display (HMD) 804 that provides a mixed-reality experience. At the present time, the user is using the HMD 804 to interact with a physical object 806 in the physical environment.

In one implementation, the HMD 804 includes a depth camera system that uses the mechanism 102 of FIG. 1 to scan the object 806 (e.g., per the object-scanning apparatus of FIG. 7). Alternatively, or in addition, the HMD 804 includes a retinal display to project image information directly to the eyes of the user (e.g., per the display apparatus 602 of FIG. 6).

The HMD 804 may suffer from motion artifacts caused by two kinds of motions. In a first case, the user may move the HMD 804, e.g., by moving his or her body to which the HMD 804 is attached. In a second case, the object 806 which is being scanned by the HMD 804 may be in motion. The HMD 804 can mitigate the effects of both causes of motion by employing the scanning path described in Subsection A.1.

Figure 9:
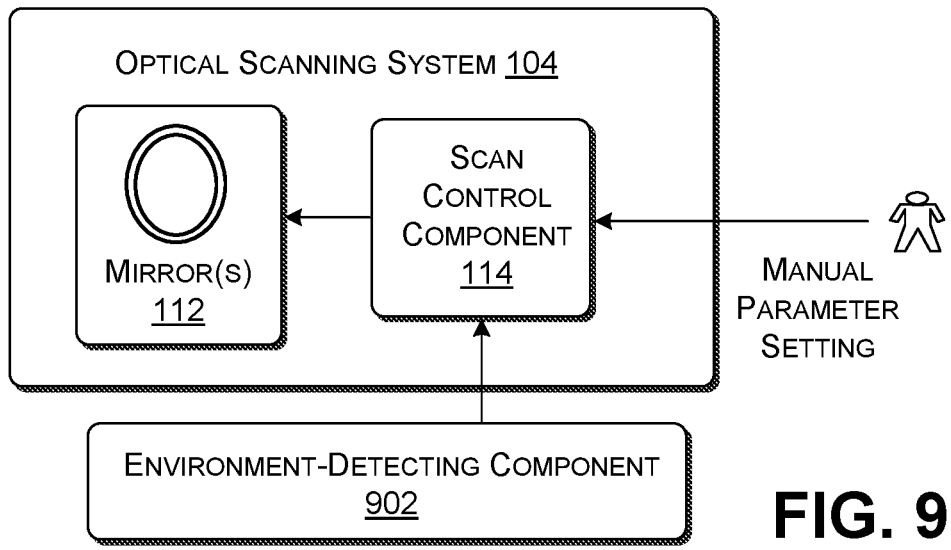
FIG. 9 shows a variation of the apparatus of FIG. 1, which incorporates the ability to dynamically modify the scanning path based on or more factors.

FIG. 9 shows a variation of the scanning system 104 of FIG. 1. In this case, the scan control component 114 receives input signals that specify one or more control factors. The scan control component 114 uses the factor(s) to dynamically modify the operation of the scanning system 104. For example, in one implementation, the control factor(s) indicate that the motion is currently affecting the scanning system 104. In response, the scan control component 114 can dynamically increase the number of passes in the scanning path, while also increasing the level of sparsity in each individual pass (e.g., by increasing the rate $r_{new}$ shown in FIG. 2). This has the effect of distributing the deleterious effects of motion more evenly across the field. In some implementations, this can be achieved by sampling the field with the same resolution as before. Alternatively, or in addition, the scan control component 114 can temporarily shift the timing at which each frame (associated with a scanning path) begins relative to other frames (and other associated scanning paths). This also helps distribute the effects of motion across the field.

The scan control component 114 can receive input signals from one or more sources. For instance, a user can manually provide the input signals. Alternatively, or in addition, the scan control component 114 can receive the input signals from an environment-detecting component 902. For example, the environment-detecting component 902 can include an inertial measurement unit (IMU) that is associated with the scanning system 104. For instance, the IMU may be a component of an HMD which implements the mechanism 102. The IMU provides input signals that identify when the scanning system 104 is in motion. Alternatively, or in addition, the environment-detecting component 902 may correspond to a blur-detecting component that detects blur in image information produced by the object-scanning apparatus 702 of FIG. 7. For instance, the blur-detecting component can determine the amount of blur by analyzing the frequency characteristics of the image information, e.g., to assess the level of contrast associated with its edges. The blur-detecting component can then compare the results of that analysis with a threshold value. For instance, in one merely illustrative case, the blur-detecting component can determine the amount of blur in image information using a Laplacian-based operator, a gradient-based operator, etc., which determine the sharpness of edges in the image information.

B. Illustrative Processes

Figure 10:
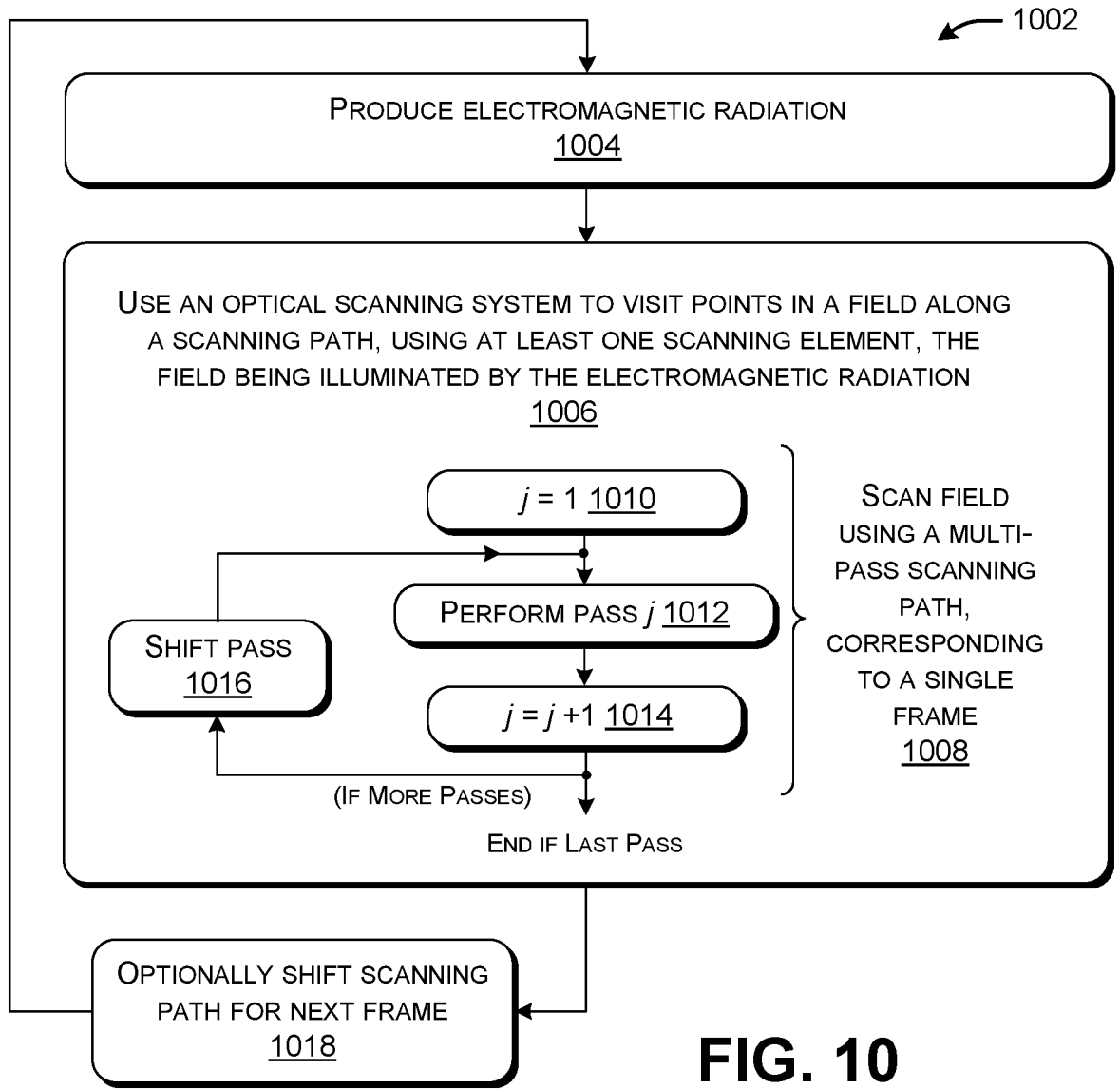
FIG. 10 shows a process that represents one manner of operation of the mechanism of FIG. 1.
Figure 11:
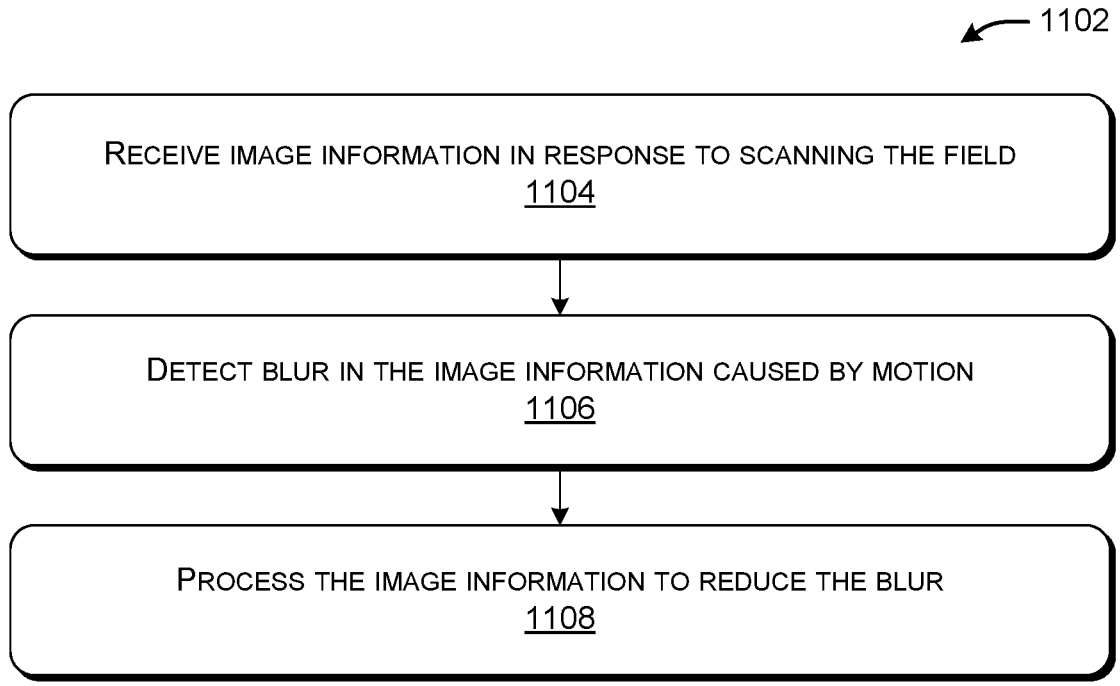
FIG. 11 shows a process for mitigating the effects of blur, for use in conjunction with the process of FIG. 10.
Figure 12:
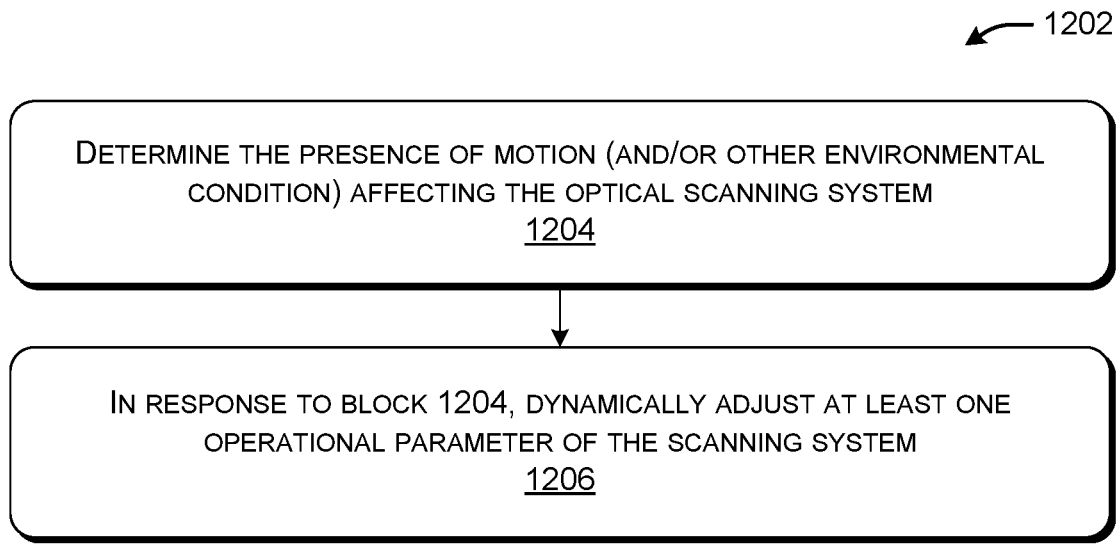
FIG. 12 shows a process for dynamically varying a scanning path.

FIGS. 10-12 show processes that explain the operation of the mechanism 102 of Section A in flowchart form. Since the principles underlying the operation of the mechanism 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 10 shows a process 1002 for optically scanning a field 106 using the mechanism 102 of FIG. 1. In block 1004, the mechanism 102 produces electromagnetic radiation, such as a beam of electromagnetic radiation. In block 1006, the mechanism 102 uses an optical scanning system 104 to visit points in a field 106 along a scanning path 108, using at least one scanning element (such as one or more mirrors 112), the field 106 being illuminated by the electromagnetic radiation. The field 106 has an area characterized by a first span with respect to a first axis, and a second span with respect to a second axis. The scanning path 108 includes consecutive passes, the passes corresponding to time-shifted instances of a same scan pattern. The scan pattern associated with an individual pass includes repeated sweeps back and forth across the first span at a first rate, and movement across the second span at a second rate. The first rate is greater than the second rate. The plural passes visit different sets of points within the field 106, to provide different respective sparse traversals of the field 106 captured at different times. Further, the plural passes, taken together, evenly distribute motion artifacts over the field 106 upon occurrence of motion, to produce artifacts resembling blur (e.g., as perceived by a human observer). Note that FIG. 10 shows block 1004 as preceding block 1006, but the illumination of the field 106 is to be understood as occurring throughout the scanning associated with block 1006.

More specifically, block 1006 encompasses a sub-process 1008 by which the mechanism 102 scans the field 106 using plural paths associated with a single frame. In blocks 1010-1014, the mechanism 102 consecutively performs its plural passes. Block 1016 specifies that the mechanism 102 temporally shifts each new pass relative to a previous pass. Block 1018 specifies that the mechanism 102 can optionally temporally shift each frame relative to the previous frame in the manner described above. In another case, the mechanism 102 performs block 1018 only when some control factor indicates that it should be performed (such as when the environment-detecting component 902 detects the presence of motion).

FIG. 11 shows a process 1102 for mitigating the effects of blur, for use in conjunction with the process of FIG. 10. In block 1104, the mechanism 102 receives image information in response to scanning the field 106. In block 1106, the mechanism 102 detects blur in the image information caused by motion. In block 1108, the mechanism 102 processes the image information to reduce the blur.

FIG. 12 shows a process 1202 for dynamically varying the operation of the scanning system 104 based on the detection of motion and/or some other environmental condition. In block 1204, the mechanism 102 determines presence of motion (and/or some other environmental condition) affecting the scanning system 104. In block 1206, in response to the determining operation, the mechanism 102 dynamically adjusts at least one operational parameter of the scanning system 104, such as a number of passes used in the scanning path 108, a sparsity of each individual pass, a temporal shift between frames (scanning paths), etc., or any combination thereof.

C. Representative Computing Functionality

Figure 13:
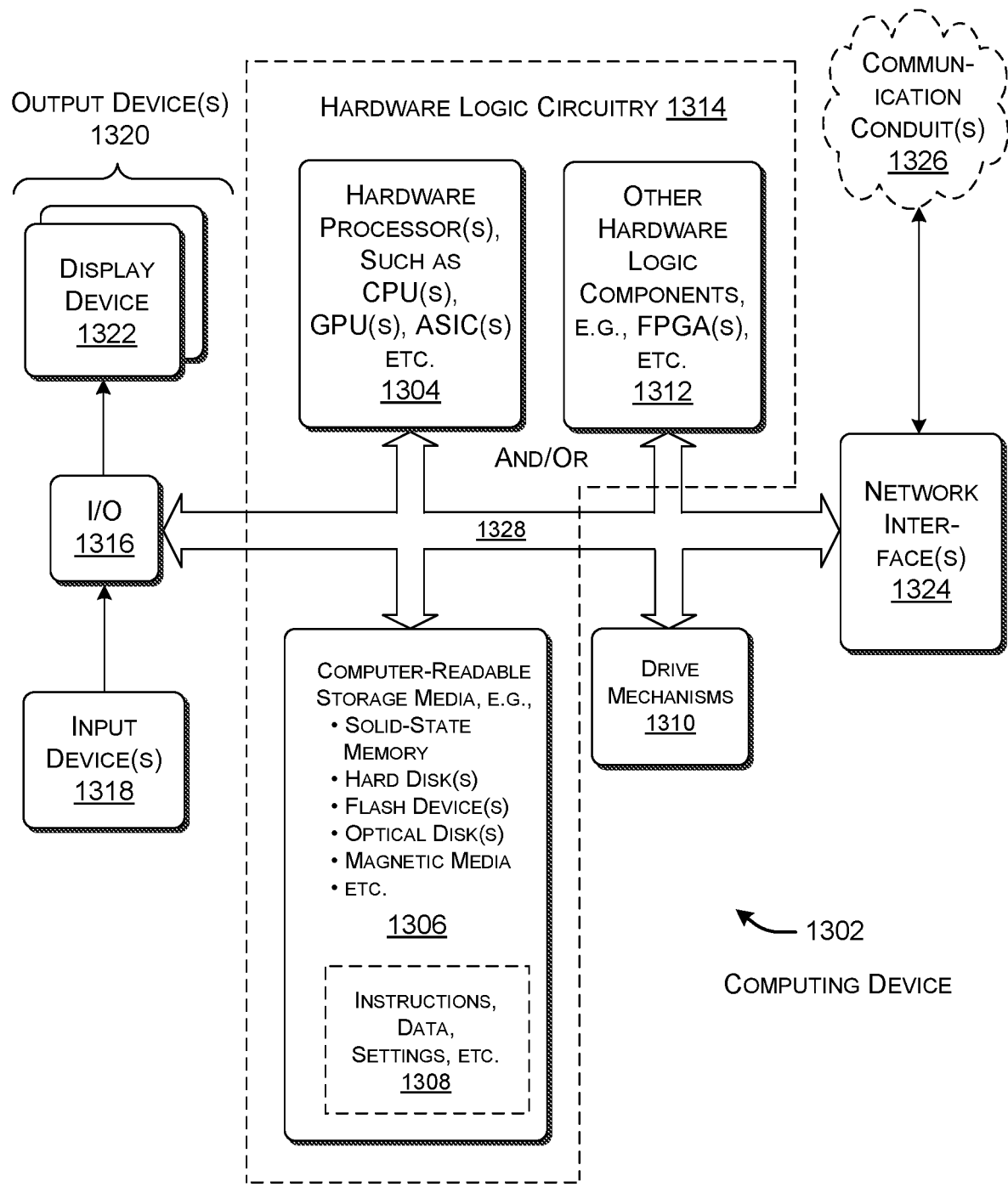
FIG. 13 shows an illustrative type of computing device that can be used to implement any processing-related aspects of the features shown in the foregoing drawings.

FIG. 13 shows a computing device 1302 that can be used to implement the processing-related aspects of the mechanism 102 set forth in the above-described figures. For instance, the type of computing device 1302 shown in FIG. 13 can be used to implement the scan control component 114, and/or the post-processing components 712 of FIG. 7. In another context, the computing device 1302 can incorporate the mechanism 102 as one component thereof. In all cases, the computing device 1302 represents a physical and tangible processing mechanism.

The computing device 1302 can include one or more hardware processors 1304. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1302 can also include computer-readable storage media 1306, corresponding to one or more computer-readable media hardware units. The computer-readable storage media 1306 retains any kind of information 1308, such as machine-readable instructions, settings, data, etc. Without limitation, for instance, the computer-readable storage media 1306 may include one or more solid-state devices, one or more magnetic hard disks, one or more optical disks, magnetic tape, and so on. Any instance of the computer-readable storage media 1306 can use any technology for storing and retrieving information. Further, any instance of the computer-readable storage media 1306 may represent a fixed or removable component of the computing device 1302. Further, any instance of the computer-readable storage media 1306 may provide volatile or non-volatile retention of information.

The computing device 1302 can utilize any instance of the computer-readable storage media 1306 in different ways. For example, any instance of the computer-readable storage media 1306 may represent a hardware memory unit (such as Random Access Memory (RAM)) for storing transient information during execution of a program by the computing device 1302, and/or a hardware storage unit (such as a hard disk) for retaining/archiving information on a more permanent basis. In the latter case, the computing device 1302 also includes one or more drive mechanisms 1310 (such as a hard drive mechanism) for storing and retrieving information from an instance of the computer-readable storage media 1306.

The computing device 1302 may perform any of the functions described above when the hardware processor(s) 1304 carry out computer-readable instructions stored in any instance of the computer-readable storage media 1306. For instance, the computing device 1302 may carry out computer-readable instructions to perform each block of the processes described in Section B.

Alternatively, or in addition, the computing device 1302 may rely on one or more other hardware logic components 1312 to perform operations using a task-specific collection of logic gates. For instance, the hardware logic component(s) 1312 may include a fixed configuration of hardware logic gates, e.g., that are created and set at the time of manufacture, and thereafter unalterable. Alternatively, or in addition, the other hardware logic component(s) 1312 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 13 generally indicates that hardware logic circuitry 1314 corresponds to any combination of the hardware processor(s) 1304, the computer-readable storage media 1306, and/or the other hardware logic component(s) 1312. That is, the computing device 1302 can employ any combination of the hardware processor(s) 1304 that execute machine-readable instructions provided in the computer-readable storage media 1306, and/or one or more other hardware logic component(s) 1312 that perform operations using a fixed and/or programmable collection of hardware logic gates.

In some implementations, the computing device 1302 also includes an input/output interface 1316 for receiving various inputs (via input devices 1318), and for providing various outputs (via output devices 1320). One particular output mechanism may include a display device 1322. The computing device 1302 can also include one or more network interfaces 1324 for exchanging data with other devices via one or more communication conduits 1326. One or more communication buses 1328 communicatively couple the above-described components together.

The communication conduit(s) 1326 can be implemented in any manner, e.g., by a local area computer network, a wide area computer network (e.g., the Internet), point-to-point connections, etc., or any combination thereof. The communication conduit(s) 1326 can include any combination of hardwired links, wireless links, routers, gateway functionality, name servers, etc., governed by any protocol or combination of protocols.

FIG. 13 shows the computing device 1302 as being composed of a discrete collection of separate units. In some cases, the collection of units may correspond to discrete hardware units provided in a computing device chassis having any form factor. In other cases, the computing device 1302 can include a hardware logic component that integrates the functions of two or more of the units shown in FIG. 1. For instance, the computing device 1302 can include a system on a chip (SoC or SOC), corresponding to an integrated circuit that combines the functions of two or more of the units shown in FIG. 13.

The following summary provides a non-exhaustive set of illustrative aspects of the technology set forth herein.

According to a first aspect, a method for optically scanning a field is described. The method includes producing electromagnetic radiation. It also involves using an optical scanning system to visit points in a field along a scanning path, using at least one scanning element, the field being illuminated by the electromagnetic radiation. The field has an area characterized by a first span with respect to a first axis, and a second span with respect to a second axis. The scanning path includes consecutive passes, the passes corresponding to time-shifted instances of a same scan pattern. The scan pattern associated with an individual pass includes repeated sweeps back and forth across the first span at a first rate, and movement across the second span at a second rate, the first rate being greater than the second rate. The plural passes visit different sets of points within the field, to provide different respective sparse traversals of the field captured at different times. The plural passes, taken together, evenly distribute motion artifacts over the field upon occurrence of motion.

According to a second aspect, the aforementioned at least one scanning element corresponds to at least one mirror.

According to a third aspect, the motion is attributed to movement of the optical scanning system, and/or to movement of an object being scanned.

According to a fourth aspect, the aforementioned producing electromagnetic radiation involves producing a beam of electromagnetic radiation, wherein the optical scanning system projects the beam onto a display surface to impart images thereon, and wherein the optical scanning system controls the beam based on the scanning path.

According to a fifth aspect, the aforementioned producing electromagnetic radiation involves producing a beam of electromagnetic radiation, wherein the optical scanning system projects the beam onto a surface of a physical object, and wherein the optical scanning system controls the beam based on the scanning path and/or the optical scanning system controls sampling of electromagnetic radiation reflected from the surface based on the scanning path.

According to a sixth aspect, the method is performed by a head-mounted display to mitigate artifacts caused by motion.

According to a seventh aspect, the method further includes: receiving image information in response to scanning the field; detecting blur in the image information caused by motion; and processing the image information to reduce the blur.

According to an eighth aspect (dependent on the seventh aspect), the aforementioned processing involves performing image enhancement processing to reduce the blur.

According to a ninth aspect, the method further includes: determining presence of motion affecting the optical scanning system; and, in response to the aforementioned determining, dynamically adjusting at least one operational parameter of the optical scanning system.

According to a tenth aspect, the aforementioned at least one operational parameter corresponds to: a number of passes; and/or a rate at which the second span is traversed; and/or a temporal offset between different scanning paths.

According to an eleventh aspect, the method further includes scanning the field again using another set of consecutive passes, the aforementioned other set of consecutive passes being shifted in time from at least one previous set of consecutive passes.

According to a twelfth aspect, an apparatus is described for scanning a field. The apparatus includes an illumination system for producing electromagnetic radiation. It also includes an optical scanning system that, in turn, includes at least one scanning element and a scan control component. The scan control component is configured to control the aforementioned at least one scanning element to visit points in a field along a scanning path, the field being illuminated by the electromagnetic radiation. The field has an area characterized by a first span with respect to a first axis, and a second span with respect to a second axis. The scanning path includes consecutive passes, the passes corresponding to time-shifted instances of a same scan pattern. The scan pattern associated with an individual pass includes repeated sweeps back and forth across the first span at a first rate, and movement across the second span at a second rate, the first rate being greater than the second rate. The plural passes visit different sets of points within the field, to provide different respective sparse traversals of the field captured at different times. The plural passes, taken together, evenly distribute motion artifacts over the field upon occurrence of motion. The scan control component is implemented by hardware logic circuitry, the hardware logic circuitry corresponding to: (a) one or more hardware processors that perform operations by executing machine-readable instructions stored in a memory, and/or by (b) one or more other hardware logic components that perform operations using a task-specific collection of logic gates.

According to a thirteenth aspect (dependent on the twelfth aspect), the aforementioned at least one scanning element corresponds to at least one mirror.

According to a fourteenth aspect (dependent on the twelfth aspect), the aforementioned illumination system produces a beam of electromagnetic radiation, wherein the optical scanning system projects the beam onto a display surface to impart images thereon, and wherein the optical scanning system controls the beam based on the scanning path.

According to a fifteenth aspect (dependent on the twelfth aspect), the illumination system produces a beam of electromagnetic radiation to illuminate a physical object, wherein the optical scanning system projects the beam onto a surface of a physical object, and wherein the optical scanning system controls the beam based on the scanning path and/or the optical scanning system controls sampling of electromagnetic radiation reflected from the surface based on the scanning path.

According to a sixteenth aspect (dependent on the twelfth aspect), the scan control component is further configured to scan the field again using another set of consecutive passes, the aforementioned other set of consecutive passes being shifted in time from at least one previous set of consecutive passes.

According to a seventeenth aspect (dependent on the twelfth aspect), the apparatus further includes an error correction component, implemented by the hardware logic circuitry, that is configured to: receive image information in response to scanning the field; detect blur in the image information caused by motion; and process the image information to reduce the blur.

According to an eighteenth aspect (dependent on the twelfth aspect), the optical scanning system is configured to dynamically adjust at least one operational parameter of the optical scanning system based on motion that is detected.

According to a nineteenth aspect dependent on the eighteenth aspect, the aforementioned at least one operational parameter corresponds to: a number of passes; and/or a rate at which the second span is traversed; and/or a temporal offset between different scanning paths.

According to a twentieth aspect, a computer-readable storage medium is described for storing computer-readable instructions. The computer-readable instructions, when executed by one or more hardware processors, perform a method that includes: controlling at least one scanning element to visit points in a field along a scanning path, the field being illuminated by electromagnetic radiation. The field has an area characterized by a first span with respect to a first axis, and a second span with respect to a second axis. The scanning path includes consecutive passes, the passes corresponding to time-shifted instances of a same scan pattern. The scan pattern is associated with an individual pass including repeated sweeps back and forth across the first span at a first rate, and movement across the second span at a second rate, the first rate being greater than the second rate. The plural passes visit different sets of points within the field, to provide different respective sparse traversals of the field captured at different times. The plural passes, taken together, evenly distribute motion artifacts over the field upon occurrence of motion.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for optically scanning a field, comprising:
   producing electromagnetic radiation; and
   using an optical scanning system to visit points in a field along a scanning path, using at least one scanning element, the field being illuminated by the electromagnetic radiation,
   the field having an area characterized by a first span with respect to a first axis, and a second span with respect to a second axis,
   the scanning path including consecutive passes, the passes corresponding to time-shifted instances of a scan pattern,
   the scan pattern associated with an individual pass including repeated sweeps back and forth across the first span at a first rate, and movement across the second span at a second rate, the first rate being greater than the second rate,
   the plural passes visiting different sets of points within the field, to provide different respective sparse traversals of the field captured at different times, and
   the plural passes, taken together, distributing motion artifacts over the field,
   wherein the method further includes:
   determining presence of motion affecting the optical scanning system, wherein the motion is attributed to movement of an object to which the optical scanning system is attached, and/or to movement of an object being scanned by the optical scanning system; and
   in response to said determining, dynamically adjusting at least one operational parameter of the optical scanning system to reduce artifacts caused by the motion.

2. The method of claim 1, wherein said at least one scanning element corresponds to at least one mirror.

3. The method of claim 1, wherein said producing electromagnetic radiation produces a beam of electromagnetic radiation, wherein the optical scanning system projects the beam onto a display surface to impart images thereon, and wherein the optical scanning system controls the beam based on the scanning path.

4. The method of claim 1, wherein said producing electromagnetic radiation produces a beam of electromagnetic radiation, wherein the optical scanning system projects the beam onto a surface of a physical object, and wherein the optical scanning system controls the beam based on the scanning path and/or the optical scanning system controls sampling of electromagnetic radiation reflected from the surface based on the scanning path.

5. The method of claim 1, wherein the method is performed by a head-mounted display to mitigate artifacts caused by the motion.

6. The method of claim 1, further including:
   receiving image information in response to scanning the field;
   detecting blur in the image information caused by the motion; and
   processing the image information to reduce the blur.

7. The method of claim 6, wherein said processing involves performing image enhancement processing to reduce the blur.

8. The method of claim 1, wherein said at least one operational parameter includes a number of passes in the scanning path.

9. The method of claim 1, further comprising phase-offsetting a current multi-pass scanning path relative to a previous multi-pass scanning path, the current multi-pass scanning path occurring after the previous multi-path scanning path.

10. The method of claim 1, wherein said determining is based on input received from an environment-detecting component that identifies when the optical scanning system is in motion.

11. The method of claim 10, wherein the environment-detecting component includes an inertial measurement unit that provides the input.

12. The method of claim 1, wherein said determining is based on input received from a blur-detecting component that detects blur in image information produced by the optical scanning system.

13. The method of claim 8, wherein the number of passes is increased without changing resolution at which the field is sampled.

14. The method of claim 1, wherein said at least one operational parameter corresponds to a rate at which the second span is traversed.

15. The method of claim 1, wherein said at least one operational parameter corresponds to a temporal offset between different multi-pass scanning paths.

16. An apparatus for scanning a field, comprising:
an illumination system for producing electromagnetic radiation; and
an optical scanning system including:
at least one scanning element; and
a scan control component configured to control said at least one scanning element to visit points in a field along a scanning path, the field being illuminated by the electromagnetic radiation,
the field having an area characterized by a first span with respect to a first axis, and a second span with respect to a second axis,
the scanning path including temporally-consecutive passes, the passes corresponding to time-shifted intersecting instances of a scan pattern,
the scan pattern associated with an individual pass including repeated sweeps back and forth across the first span at a first rate, and movement across the second span at a second rate, the first rate being greater than the second rate,
the plural passes visiting different sets of points within the field, to provide different respective sparse traversals of the field captured at different times,
the plural passes, taken together, distributing motion artifacts over the field,
the apparatus further including an error correction component configured to:
receive image information in response to scanning the field;
detect blur in the image information caused by motion, the motion being attributed to movement of an object to which the optical scanning system is attached, and/or to movement of an object being scanned by the optical scanning system; and
process the image information to reduce the blur, and
the scan control component and the error correction component being implemented by hardware logic circuitry, the hardware logic circuitry including (a) one or more hardware processors that perform operations by executing machine-readable instructions stored in a memory, and/or (b) one or more other hardware logic components that perform operations using a task-specific collection of logic gates.

17. The apparatus of claim 16, wherein the scan control component is further configured to phase-offset a current multi-pass scanning path relative to a previous multi-pass scanning path, the current multi-pass scanning path occurring after the previous multi-path scanning path.

18. The apparatus of claim 16, wherein the optical scanning system is configured to dynamically adjust at least one operational parameter of the optical scanning system to further reduce artifacts caused by the motion.

19. The apparatus of claim 18, wherein said at least one operational parameter includes: a number of passes in the scanning path; and/or a rate at which the second span is traversed; and/or a temporal offset between different multi-pass scanning paths.

20. A non-transitory computer-readable storage medium for storing computer-readable instructions, the computer-readable instructions, when executed by one or more hardware processors, performing a method that comprises:
controlling at least one scanning element of an optical scanning system to visit points in a field along a scanning path, the field being illuminated by electromagnetic radiation,
the scanning path including consecutive passes, the passes corresponding to time-shifted instances of a scan pattern,
the plural passes visiting different sets of points within the field, to provide different respective sparse traversals of the field captured at different times, and
the plural passes, taken together, distributing motion artifacts over the field upon occurrence of motion,
wherein the method further includes:
determining presence of motion affecting the optical scanning system, wherein the motion is attributed to movement of an apparatus that provides the optical scanning system as a whole, and/or to movement of an object being scanned by the optical scanning system; and
in response to said determining, dynamically adjusting at least one operational parameter of the optical scanning system to reduce artifacts caused by the motion,
wherein said determining is based on input received from an environment-detecting component that identifies when the optical scanning system is in motion, and/or input received from a blur-detecting component that detects blur in image information produced by the optical scanning system.

* * * * *